(12) United States Patent
Nozawa et al.

(10) Patent No.: US 12,437,935 B2
(45) Date of Patent: Oct. 7, 2025

(54) SOLID ELECTROLYTIC CAPACITOR CONTAINING OXYGEN-CONTAINING AMINE WITHOUT HYDROXY GROUP AND METHOD FOR MANUFACTURING SAME

(71) Applicant: RUBYCON CORPORATION, Ina (JP)

(72) Inventors: Yosuke Nozawa, Ina (JP); Yoshishige Sakurai, Ina (JP)

(73) Assignee: RUBYCON CORPORATION, Ina (JP)

(*) Notice: Subject to any disclaimer, the term of this patent is extended or adjusted under 35 U.S.C. 154(b) by 76 days.

(21) Appl. No.: 18/287,703

(22) PCT Filed: May 11, 2022

(86) PCT No.: PCT/JP2022/019891
§ 371 (c)(1),
(2) Date: Oct. 20, 2023

(87) PCT Pub. No.: WO2022/255045
PCT Pub. Date: Dec. 8, 2022

(65) Prior Publication Data
US 2024/0186073 A1   Jun. 6, 2024

(30) Foreign Application Priority Data
Jun. 1, 2021 (JP) .................. 2021-092218

(51) Int. Cl.
*H01G 9/028* (2006.01)
*H01G 9/035* (2006.01)
(Continued)

(52) U.S. Cl.
CPC ............ *H01G 9/028* (2013.01); *H01G 9/035* (2013.01); *H01G 9/145* (2013.01); *H01G 9/15* (2013.01)

(58) Field of Classification Search
None
See application file for complete search history.

(56) References Cited

U.S. PATENT DOCUMENTS

| 2015/0291633 A1 | 10/2015 | Masuda |
| 2018/0108487 A1* | 4/2018 | Petrzilek ............... H01G 9/15 |
| 2018/0119306 A1* | 5/2018 | Tsubaki ............... H01G 9/145 |

FOREIGN PATENT DOCUMENTS

| JP | 07201678 A | * | 8/1995 |
| JP | 2000068155 A | * | 3/2000 |

(Continued)

OTHER PUBLICATIONS

PCT/ISA/210, "International Search Report for PCT International Application No. PCT/JP2022/019891," Aug. 9, 2022.

*Primary Examiner* — Eric W Thomas
(74) *Attorney, Agent, or Firm* — HAUPTMAN HAM, LLP

(57) ABSTRACT

A solid electrolytic capacitor includes a solid electrolyte and an electrolyte between electrode foils, and a method for manufacturing the solid electrolytic capacitor can suppress a rise in ESR and realize a longer life. As a solution, in a solid electrolytic capacitor, a basic component of an electrolytic solution contains an amine represented by formula (1). In the formula, $R^1$ represents hydrogen or an alkyl group, $R^2$ represents an alkylene group, $R^3$ represents an alkyl group. n represents an integer of 1 to 100, wherein $R^2$'s may be the same or different when n is 2 or more. m represents an integer of 1 to 3, wherein $R^1$'s may be the same or different when m is 1, and when m is 2 or 3, $R^2$'s may be the same or different, n's may be the same or different, and $R^3$'s may be the same or different.

$$NR^1{}_{(3-m)}(\!-\!(R^2O)_n\!-\!R^3)_m \qquad (1)$$

7 Claims, 3 Drawing Sheets

(51) Int. Cl.
     *H01G 9/145*     (2006.01)
     *H01G 9/15*     (2006.01)

(56)     References Cited

FOREIGN PATENT DOCUMENTS

| | | |
|---|---|---|
| JP | 2005-093595 A | 4/2005 |
| JP | 2008-109069 A | 5/2008 |
| JP | 2013-045920 A | 3/2013 |
| JP | 2014-082315 A | 5/2014 |
| JP | 2016-009770 A | 1/2016 |
| JP | 2016-015365 A | 1/2016 |
| JP | 2020-119916 A | 8/2020 |

\* cited by examiner

SOLID ELECTROLYTIC CAPACITOR CONTAINING OXYGEN-CONTAINING AMINE WITHOUT HYDROXY GROUP AND METHOD FOR MANUFACTURING SAME

RELATED APPLICATIONS

The present application is National Phase of International Application No. PCT/JP2022/019891 filed May 11, 2022, and claims priority from Japanese Application No. 2021-092218, filed Jun. 1, 2021, the disclosure of which is hereby incorporated by reference herein in its entirety.

TECHNICAL FIELD

The present invention relates to a solid electrolytic capacitor and a manufacturing method thereof.

BACKGROUND ART

Regarding "an electrolytic capacitor" in which an electrolytic solution is introduced between an anode foil having an oxide film or the like as a dielectric layer formed thereon and a cathode foil, "a solid electrolytic capacitor" in which a solid electrolyte containing a conductive polymer is introduced between the electrode foils is known (see PTL 1: JP-A-2008-109069).

A solid electrolytic capacitor generally has distinctive features such as excellent temperature stability and low equivalent series resistance (abbreviated to as ESR) compared to an electrolytic capacitor. Moreover, as shown in PTL 1 as an example, a capacitor with improved functions due to an electrolytic solution introduced between the electrode foils in addition to a solid electrolyte is also known. Hereinafter, the "solid electrolytic capacitor" referred to in the present application means such a solid electrolytic capacitor in which an electrolytic solution is introduced together with a solid electrolyte between electrode foils.

CITATION LIST

Patent Literature

PTL 1: JP-A-2008-109069
PTL 2: JP-A-2016-15365

SUMMARY OF INVENTION

Technical Problem

In an electrolytic capacitor, an amine such as triethylamine has been sometimes used for the basic component of the solute of the electrolytic solution. In a solid electrolytic capacitor, however, when an amine in which the acid dissociation constant (pKa) of the conjugate acid is relatively large, such as those used for an electrolytic capacitor, is used for the basic component of the solute of the electrolytic solution, a problem arises because the ESR increases as a result of deterioration of the solid electrolyte due to undoping of the dopant of the conductive polymer. In this regard, PTL 2 describes a solid electrolytic capacitor using a low-pKa amine in which the pKa of the conjugate acid is 14.0 or less for the basic component of the solute of the electrolytic solution (here, the pKa of triethylamine is 10.75 (at 25[° C.])). According to the solid electrolytic capacitor, undoping of the dopant of the conductive polymer can be suppressed, and the increase in the ESR can be suppressed to predetermined extent.

However, the amine described in PTL 2 has a hydroxy group at the end and thus has a problem because the conductivity easily decreases due to esterification of the amine and the acid component in the electrolytic solution and because the effect of suppressing the increase in the ESR is not sufficiently exhibited. Moreover, because the esterification reaction may be promoted by protons, the solvent which can be suitably applied may be limited to an aprotic solvent when the amine described in PTL 2 is used for the basic component of the solute of the electrolytic solution.

Solution to Problem

The present invention has been made under the circumstances and aims to provide a solid electrolytic capacitor which contains a solid electrolyte and an electrolytic solution between electrode foils and which can suppress increase in the ESR sufficiently for a long time and can achieve a long lifetime and to provide a manufacturing method thereof.

The present invention solves the problems by the solutions described below as embodiments.

The solid electrolytic capacitor according to the present invention is a solid electrolytic capacitor including: an anode foil having a dielectric layer formed thereon; a cathode foil; and a solid electrolyte and an electrolytic solution in a gap between the anode foil and the cathode foil, in which the electrolytic solution contains a solvent and a solute, the solute contains an acid component and a basic component and the basic component contains an amine represented by the general formula (1).

[Chem. 1]

$$NR^1_{(3-m)}(-(R^2O)_n-R^3)_m \qquad (1)$$

(In the formula, $R^1$ represents hydrogen or an alkyl group, and $R^2$ represents an alkylene group. $R^3$ represents an alkyl group.

n represents an integer of 1 to 100, where $R^2$'s may be the same or different when n is 2 or more.

m represents an integer of 1 to 3, where $R^1$'s may be the same or different when m is 1, and when m is 2 or 3, $R^2$'s may be the same or different, n's may be the same or different, and $R^3$'s may be the same or different.)

In this manner, the present invention is characterized in that the basic component of the solute of the electrolytic solution contains an oxygen-containing amine which does not contain any hydroxy group. According to the characteristic, because a hydrophilic oxygen atom is contained, the amine can be prevented from easily coming close to the hydrophobic conductive polymer such as PEDOT-PSS. Accordingly, undoping of the dopant due to the amine can be suppressed. Moreover, because no hydroxy group is contained, esterification with the acid component in the electrolytic solution such as a carboxylic acid can be prevented. Accordingly, predetermined conductivity can be maintained for a long time.

Furthermore, the solvent preferably contains a polyol compound. The polyol compound has low volatility and thus has high performance of maintaining the electrolytic solution, maintains the functions thereof for a long time and can suppress deterioration of the conductive polymer. Moreover, the polyol compound has a strong solvation effect, solvates the cation of the base, makes it difficult to come close to the conductive polymer and can suppress undoping of the dopant. The solvation effect becomes stronger as the solvent has more hydroxy groups relative to the molecular weight thereof, and thus a polyol compound in which the number X of the hydroxy groups satisfies the requirement X≥(Y/200) (here, Y represents the molecular weight of the polyol compound) can be more suitably applied.

The acid dissociation constant (pKa) of the conjugate acid of the amine is preferably 12.0 or less. When the acid dissociation constant (pKa) of the conjugate acid of the amine is small, the nucleophilicity is low. Thus, excessive dissociation of the basic component is suppressed, and it becomes difficult to come close to the conductive polymer. Accordingly, undoping of the dopant can be suppressed.

The method for manufacturing a solid electrolytic capacitor according to the present invention is a method for manufacturing a solid electrolytic capacitor including: an anode foil having a dielectric layer formed thereon; a cathode foil; and a solid electrolyte and an electrolytic solution in a gap between the anode foil and the cathode foil, in which the electrolytic solution is introduced into the gap between the anode foil and the cathode foil after the solid electrolyte is introduced into the gap and an amine represented by the general formula (1) is contained in a solute of the electrolytic solution.

[Chem. 2]

$$NR^1{}_{(3-m)}(-(R^2O)_n-R^3)_m \quad (1)$$

(In the formula, $R^1$ represents hydrogen or an alkyl group, and $R^2$ represents an alkylene group. $R^3$ represents an alkyl group.

n represents an integer of 1 to 100, where $R^2$'s may be the same or different when n is 2 or more.

m represents an integer of 1 to 3, where $R^1$'s may be the same or different when m is 1, and when m is 2 or 3, $R^2$'s may be the same or different, n's may be the same or different, and $R^3$'s may be the same or different.)

In this manner, the present invention is characterized in that the basic component of the solute of the electrolytic solution contains an oxygen-containing amine which does not contain any hydroxy group. According to the characteristic, because a hydrophilic oxygen atom is contained, the amine can be prevented from easily coming close to the hydrophobic conductive polymer such as PEDOT-PSS. Accordingly, undoping of the dopant due to the amine can be suppressed. Moreover, because no hydroxy group is contained, esterification with the acid component in the electrolytic solution such as a carboxylic acid can be prevented. Accordingly, predetermined conductivity can be maintained for a long time.

Advantageous Effects of Invention

According to the present invention, increase in the ESR can be suppressed sufficiently for a long time, and a long lifetime of the capacitor can be achieved.

DESCRIPTION OF EMBODIMENTS

Embodiments of the present invention are explained in detail below referring to the figures. In this regard, the embodiments are explained using a winding-type solid electrolytic capacitor 1 (sometimes referred to as "capacitor 1" below) as an example, but the type of the capacitor 1 is not limited and may be a lamination-type or the like for example.

(Capacitor Element)

Figure 1:
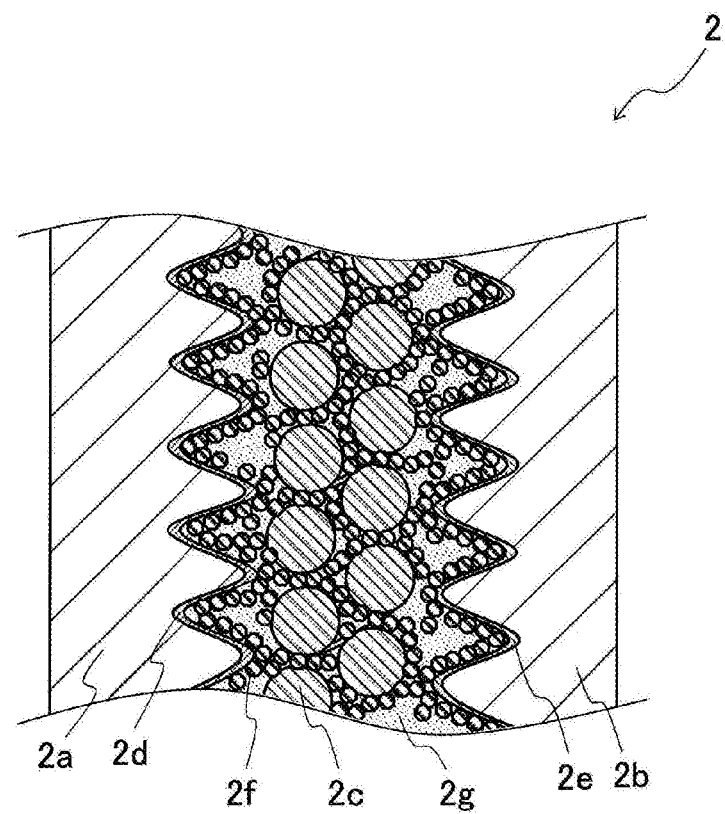
FIG. 1 is a sectional view schematically illustrating the main parts of the capacitor element in the solid electrolytic capacitor according to an embodiment of the present invention.

FIG. 1 is a sectional view schematically illustrating the main parts of a capacitor element 2 in the solid electrolytic capacitor 1 according to the embodiment. The capacitor element 2 has an anode foil 2a, a cathode foil 2b and a separator 2c lying between the anode foil 2a and the cathode foil 2b. The anode foil 2a and the cathode foil 2b are made of, for example, a valve metal such as aluminum, tantalum and niobium. On the surface of the anode foil 2a which is made rough through etching treatment, an oxide film 2d as a dielectric layer is formed through chemical conversion treatment (the easiness of forming the oxide film 2d is sometimes referred to as "chemical conversion property" below). On the surface of the cathode foil 2b which is made rough through etching treatment, an oxide film 2e is formed through natural oxidation. Roughening of the electrode foils 2a, 2b can form etch pits (holes), make the specific surface area large and increase the capacitance. For the separator 2c, for example, a separator formed using cellulose fibers having chemical affinity with a conductive polymer or a hydrophilic polymer, or a synthetic resin having excellent heat resistance such as nylon, polypropylene (PP), polyethylene (PE), polyethylene terephthalate (PET) and polyphenylene sulfide (PPS) can be applied.

The capacitor element 2 contains a solid electrolyte 2f and an electrolytic solution 2g in the gap between the anode foil 2a and the cathode foil 2b excluding the separator 2c. In this regard, however, a part of the solid electrolyte 2f may be in the separator 2c, or a part of the electrolytic solution 2g may be impregnated into the separator 2c. The solid electrolyte 2f is configured in such a manner that the solid electrolyte 2f is in contact with the dielectric layer (the oxide film 2d) formed on the anode foil 2a with a rough surface and substantially functions as a cathode as the counter electrode of the anode foil 2a. The distribution pattern of the solid electrolyte 2f is not limited, and the solid electrolyte 2f is sometimes formed in the gap between the electrode foils 2a, 2b in a column form, a network form, a layer form or the like.

The solid electrolyte 2f contains a conductive polymer. The conductive polymer is, for example, a π-conjugated polymer and sometimes contains a dopant which exhibits or improves conductance. That is, the conductive polymer contains a polymer having an insulator-like property or a semiconductor-like property which can exhibit conductance by doping. Examples of the conductive polymer include, for example, "poly(3,4-ethylenedioxythiophene)" (PEDOT), "tetracyanoquinodimethane" (TCNQ), "polypyrrole" (PPy), "polyaniline" (PANI), "polythiophene" (PT) and the like, and the conductive polymers appropriately contain a dopant such as polystyrenesulfonic acid (PSS), toluenesulfonic acid, alkylbenzenesulfonic acid and naphthalenesulfonic acid and have predetermined conductance. For the conductive polymer contained in the solid electrolyte 2f, for example, polystyrenesulfonic acid (PSS)-doped "poly(3,4-ethylenedioxythiophene)" (PEDOT), which is so-called "PEDOT-PSS", or the like is suitably applied. According to the electron conductance of the conductive polymer, conductivity which is incomparably larger than ionic conductance is exhibited. Thus, the solid electrolytic capacitor 1 can achieve low ESR compared to an electrolytic capacitor and also has excellent temperature stability.

The conductive polymer is formed in a particle form with a size on the order of nanometer scale (1 [nm] or more). In FIG. 1, the solid electrolyte 2f shows the particles of the conductive polymer. As illustrated in the figure, the particles of the conductive polymer are preferably in the etch pits of the anode foil 2a and are preferably in contact with the dielectric layer (the oxide film 2d) with a wide area. From such a point, the average particle size of the conductive polymer compound is preferably 300 [nm] or less, more suitably 200 [nm] or less, further suitably 100 [nm] or less. The conductive polymer compound here means that particles of the conductive polymer which contain the dopant and are integrated with the dopant, of the particles of the conductive polymer, are included.

As the method for introducing such a conductive polymer between the electrode foils 2a, 2b, a method of introducing a monomer, a dopant, an oxidizing agent, a polymerization catalyst and the like and synthesizing the conductive polymer by oxidative polymerization of the monomer in the capacitor element 2, a method of introducing a conductive polymer dispersion which is polymerized and doped in advance or a conductive polymer solution of self-doping type and drying to remove the dispersant or the solvent such as water or the like can be used. Of these, according to the method using a dispersion or a solution, the polymerization reaction which has certain adverse effects on the characteristics of the capacitor 1 is not conducted in the capacitor element 2, and the residue of the polymerization reaction (for example, the oxidizing agent or the like) which similarly has certain adverse effects on the characteristics of the capacitor 1 does not stay in the capacitor element 2. Thus, the rated voltage of the capacitor 1 can be made higher, and the method is thus suitable.

The solid electrolyte 2f may contain any additive in addition to the conductive polymer compound. The additive is a stabilizer, a reaction inhibitor or the like which is introduced together with the conductive polymer, the monomer or the like for the purpose of improving or complementing the characteristics of the conductive polymer such as conductance, for the purpose of repairing a defect part of the oxide film 2d or for another purpose. Specifically, examples thereof include glycerol, diglycerol, polyglycerol and the like which are introduced in an aqueous dispersion of the conductive polymer.

In the gap between the electrode foils 2a, 2b, the electrolytic solution 2g is introduced to surround the solid electrolyte 2f above or fill the space of the solid electrolyte 2f. The electrolytic solution 2g of the present application is, for example, a liquid component having fluidity and may be a component having viscosity. The electrolytic solution 2g may completely fill the gap between the electrode foils 2a, 2b excluding the separator 2c and the solid electrolyte 2f but does not have to completely fill so that a predetermined gap is left between the electrode foils 2a, 2b.

The electrolytic solution 2g mainly improves or complements the conductance of the conductive polymer or repairs a defect part of the oxide film 2d. That is, the electrolytic solution 2g has a similar function to that of the additive of the solid electrolyte 2f, but while the additive is introduced into the capacitor element 2 together with the conductive polymer, the monomer or the like, the electrolytic solution 2g can be introduced after the solid electrolyte 2f is introduced as described below. As a result, the electrolytic solution 2g can surround the solid electrolyte 2f or fill the space of the solid electrolyte 2f in the gap between the electrode foils 2a, 2b. In this regard, however, a mixture phase of the both may be formed at the boundary or the like of the solid electrolyte 2f and the electrolytic solution 2g.

The electrolytic solution 2g contains a solvent and a solute. The solute contains at least one kind of salt, which means that the solute contains at least one kind of acid component and a basic component. The acid component may be any of an organic acid, an inorganic acid and a composite compound thereof. Examples of the organic acid include carboxylic acids, phenols, sulfonic acids and the like. Examples of the carboxylic acid include formic acid, phthalic acid, isophthalic acid, terephthalic acid, salicylic acid, sulfosalicylic acid, maleic acid, adipic acid, benzoic acid, toluic acid, enanthic acid, malonic acid, 1,6-decanedicarboxylic acid, 1,7-octanedicarboxylic acid, azelaic acid, resorcylic acid, phloroglucinic acid, gallic acid, citric acid and the like. Examples of the inorganic acid include boric acid, phosphoric acid, phosphorous acid, hypophosphorous acid, carbonic acid, silicic acid and the like. The composite compounds of an organic acid and an inorganic acid include borodisalicylic acid, borodioxalic acid, borodiglycollic acid and the like. A kind thereof may be contained, or two or more kinds may be contained. The acid component in the electrolytic solution 2g has a function of forming a new oxide film (re-chemical conversion) at a defect part through application of electricity at a predetermined voltage to repair the oxide film 2d if a defect part is formed in the oxide film 2d, and thus the chemical conversion property of the capacitor 1 can be improved.

The embodiment is characterized by containing an amine represented by the general formula (1) below as a base.

[Chem. 3]

$$NR^1{}_{(3-m)}(-(R^2O)_n-R^3)_m \qquad (1)$$

(In the formula, $R^1$ represents hydrogen or an alkyl group, and $R^2$ represents an alkylene group. $R^3$ represents an alkyl group.

n represents an integer of 1 to 100, where $R^2$'s may be the same or different when n is 2 or more.

m represents an integer of 1 to 3, where $R^1$'s may be the same or different when m is 1, and when m is 2 or 3, $R^2$'s may be the same or different, n's may be the same or different, and $R^3$'s may be the same or different.)

n is an integer of 1 to 100 which shows the number of moles of added $R^2O$ and is preferably suitably an integer of 1 to 30, more suitably an integer of 1 to 10. When n is smaller than 100 or smaller than 30, the viscosity is small, and impregnation into the etch pits or the space in the conductive polymer is easy. Moreover, handling is also excellent. Here, $(R^2O)_n$ may be a random bond or a block bond. Moreover, $R^2$, which is an alkylene group, is preferably suitably a lower alkylene group having 1 to 4 carbon atoms, more suitably a methylene group or an ethylene group. When the carbon atom number is low, as in a lower alkylene group, the viscosity is small, and impregnation into the etch pits or the space in the conductive polymer is easy. Moreover, handling is also excellent.

Amines represented by the general formula (1) include a primary amine, a secondary amine and a tertiary amine, and examples thereof include 2-methoxyethylamine, methoxy (methyl)amine, N-(2-methoxyethyl)methylamine, bis(2-methoxyethyl)amine, bis(2-ethoxyethyl)amine and the like. A kind thereof may be contained, or two or more kinds may be contained.

The amine represented by the general formula (1) is characterized by not containing any hydroxy group, unlike an alkylene oxide adduct of an amine such as ethanolamine, diethanolamine and N-methyldiethanolamine. Moreover, the amine represented by the general formula (1) is an amine containing oxygen, unlike an alkyl group-substituted amine such as pentylamine, piperidine, N-tert-butylethylamine, dipropylamine, dimethylbutylamine, tributylamine and cyclohexylamine. The embodiment is characterized by containing such an amine salt in the solute of the electrolytic solution $2g$.

According to the characteristic, because a hydrophilic oxygen atom is contained, the amine can be prevented from easily coming close to the hydrophobic conductive polymer such as PEDOT-PSS. Accordingly, undoping of the dopant due to the amine can be suppressed. Moreover, because no hydroxy group is contained, esterification with the acid component in the electrolytic solution such as a carboxylic acid can be prevented. Accordingly, predetermined conductivity can be maintained for a long time. As a result, as described below, increase in the ESR can be suppressed sufficiently even when a high-temperature load in an atmosphere at 135[° C.] for 1000 [hours] is applied while applying a rated voltage, and a long lifetime of the capacitor 1 can be achieved (see the Examples).

Furthermore, because the amine represented by the general formula (1) has a relatively high boiling point, the heat resistance of the capacitor 1 can also be improved. Moreover, an effect of repairing the oxide film $2d$ can be exhibited in the electrolytic solution together with the acid component, and the chemical conversion property of the capacitor 1 can be improved.

Here, when the acid dissociation constant (pKa) of the conjugate acid of the basic component is high, excessive dissociation into the base occurs easily, and it becomes easy to come close to the conductive polymer. Thus, of the amines according to the embodiment, an amine in which the acid dissociation constant (pKa) of the conjugate acid is 12.0 or less can be more suitably applied, and an amine in which the acid dissociation constant (pKa) of the conjugate acid is 10.0 or less can be further suitably applied. An amine in which the acid dissociation constant (pKa) of the conjugate acid is 9.0 or less can be further suitably applied. The pKa values of the amines shown above as examples of the amine represented by the general formula (1) are all 10 or less. For example, the pKa of bis(2-methoxyethyl)amine is 8.67±0.19, and the pKa of bis(2-ethoxyethyl)amine is 8.62±0.19, while the pKa of methoxy(methyl)amine is 4.75±0.10, which is lower (all are predicted values). Because the nucleophilicity of these amines is low, excessive dissociation of the basic component is suppressed, and it becomes difficult to come close to the conductive polymer. Accordingly, undoping of the dopant can be suppressed.

Examples of the solvent of the electrolytic solution $2g$ include polyol compounds such as ethylene glycol, diethylene glycol, triethylene glycol, tetraethylene glycol, pentaethylene glycol, glycerol and diglycerol, GBL (γ-butyrolactone), sulfolane, 3-methylsulfolane, 2,4-dimethylsulfolane, dimethylformamide and the like. A kind thereof may be contained, or two or more kinds may be contained. Of these, a polyol compound or the like is suitably applied.

The polyol compound referred to in the present application is a compound which is a polyhydric alcohol and which has two or more hydroxy groups (—OH) in the molecule. Because the volatility of the polyol compound is low, the polyol compound has high performance of maintaining the electrolytic solution $2g$, maintains the functions thereof for a long time and can suppress deterioration of the conductive polymer. Moreover, the polyol compound has a strong solvation effect, solvates the cation of the basic component, makes it difficult to come close to the conductive polymer and can suppress undoping of the dopant. The solvation effect becomes stronger as the solvent has more hydroxy groups relative to the molecular weight thereof. Accordingly, a polyol compound in which the number X of the hydroxy groups satisfies the requirement $X \geq (Y/200)$ (here, Y represents the molecular weight of the polyol compound) can be more suitably applied, and a polyol compound in which the number X of the hydroxy groups satisfies the requirement $X \geq (Y/150)$ (here, Y represents the molecular weight of the polyol compound) can be further suitably applied. A polyol compound in which the number X of the hydroxy groups satisfies the requirement $X \geq (Y/100)$ (here, Y represents the molecular weight of the polyol compound) can be further suitably applied.

For example, ethylene glycol (structural formula: HO—$CH_2$—$CH_2$—OH) has two hydroxy groups (—OH) (X is 2), and the molecular weight is 62.07. Accordingly, Y/200 is 0.31, and Y/150 is 0.41. Y/100 is 0.62. Thus, all the requirements $X \geq (Y/200)$, $X \geq (Y/150)$ and $X \geq (Y/100)$ are satisfied. Similarly, diethylene glycol (the number of the hydroxy groups: 2, the molecular weight: 106.12), triethylene glycol (the number of the hydroxy groups: 2, the molecular weight: 150.17), tetraethylene glycol (the number of the hydroxy groups: 2, the molecular weight: 194.23), glycerol (the number of the hydroxy groups: 3, the molecular weight: 92.09), diglycerol (the number of the hydroxy groups: 4, the molecular weight: 166.17) and the like also satisfy all the requirements $X \geq (Y/200)$, $X \geq (Y/150)$ and $X \geq (Y/100)$. Moreover, pentaethylene glycol (the number of the hydroxy groups: 2, the molecular weight: 238.28) and the like satisfy the requirements $X \geq (Y/200)$ and $X \geq (Y/150)$.

These polyol compounds have stronger solvation effects and can further suppress undoping of the dopant. Accordingly, the solvent is particularly preferably composed of such a polyol compound. Alternatively, such a polyol compound is particularly preferably contained when the solvent is a mixture of a polyol compound and another substance or when the solvent is a polymer like polyethylene glycol (structural formula: HO—$(CH_2—CH_2—O)_n$—H, the number of the hydroxy groups: 2) and contains a mixture of two or more kinds of polyol compound. Regarding the amount in this case, for example, when 30 [mass %] or more is contained in the entire solvent, the purpose can be achieved sufficiently, and undoping of the dopant can be suppressed sufficiently. Moreover, when 50 [mass %] or more is contained in the entire solvent, undoping of the dopant can be suppressed further sufficiently.

As described above, according to the amine according to the embodiment, esterification with the acid in the electrolytic solution is prevented. Accordingly, a protic solvent such as a polyol compound, which may cause the esterification reaction more easily, can be applied without problems, and the only excellent effects of the polyol compound described above can be obtained.

In addition, any additive may be contained in the gap between the electrode foils $2a$, $2b$ together with the electrolytic solution $2g$. The additive is an additive which is introduced, when necessary, with the electrolytic solution $2g$ after the solid electrolyte $2f$ is introduced, and specifically, examples thereof include compounds having a nitro group such as nitrophenol, nitrobenzoic acid, nitroacetophenone, nitroanisole and nitrobenzyl alcohol and the like which are added for the purpose of absorbing hydrogen gas generated in re-chemical conversion reaction or the like and improving the pressure resistance or the heat resistance. The additive can surround the solid electrolyte $2f$ or fill the space of the solid electrolyte $2f$ like the electrolyte.

(Solid Electrolytic Capacitor)

Figure 2:
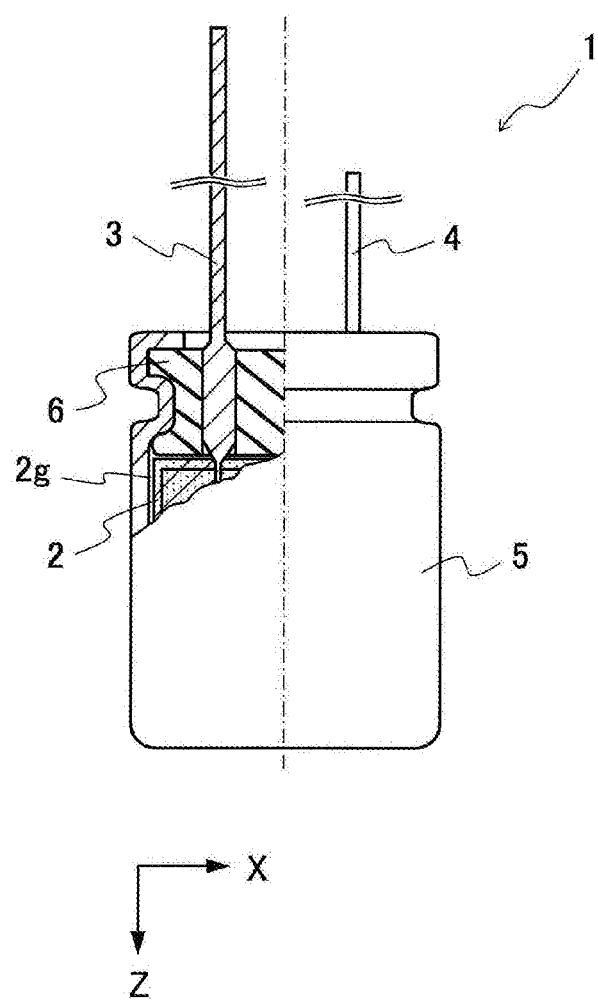
FIG. 2 is a partial sectional view illustrating an example of a solid electrolytic capacitor having the capacitor element of FIG. 1.

Subsequently, FIG. 2 is a partial sectional view illustrating an example of the solid electrolytic capacitor 1 having the capacitor element 2 described above. The solid electrolytic capacitor 1 according to the embodiment is a winding-type capacitor 1 and has the capacitor element 2, a first lead terminal 3 connected to the anode foil $2a$ of the capacitor element 2, a second lead terminal 4 connected to the cathode foil $2b$ of the capacitor element 2, a case 5 housing the capacitor element 2 and a sealing part 6 which seals the opening of the case 5 housing the capacitor element 2.

The case 5 has a cylindrical shape with a bottom and is made of, for example, a metal such as aluminum. The sealing part 6 has a substantially column shape which fits the internal shape of the case 5, and through holes in which the lead terminals 3, 4 go through and fit at predetermined positions are provided. This results in a structure in which the lead terminals 3, 4 connected to the capacitor element 2 are brought out from the capacitor 1 through the through holes in the state in which the case 5 is sealed with the sealing part 6. In this regard, the sealing part 6 is preferably made of a material which is insulating, highly airtight to prevent leakage or scattering of a substance from the case 5 and prevent contamination of the case 5 and adequately elastic to closely adhere to the case 5 or the lead terminals 3, 4 and which can further maintain the performances even in a high-temperature state or a low-temperature state. For example, a rubber composition such as isobutylene/isoprene rubber, butyl rubber, ethylene propylene rubber and fluoro rubber or another elastomer material is applied.

Figure 3:
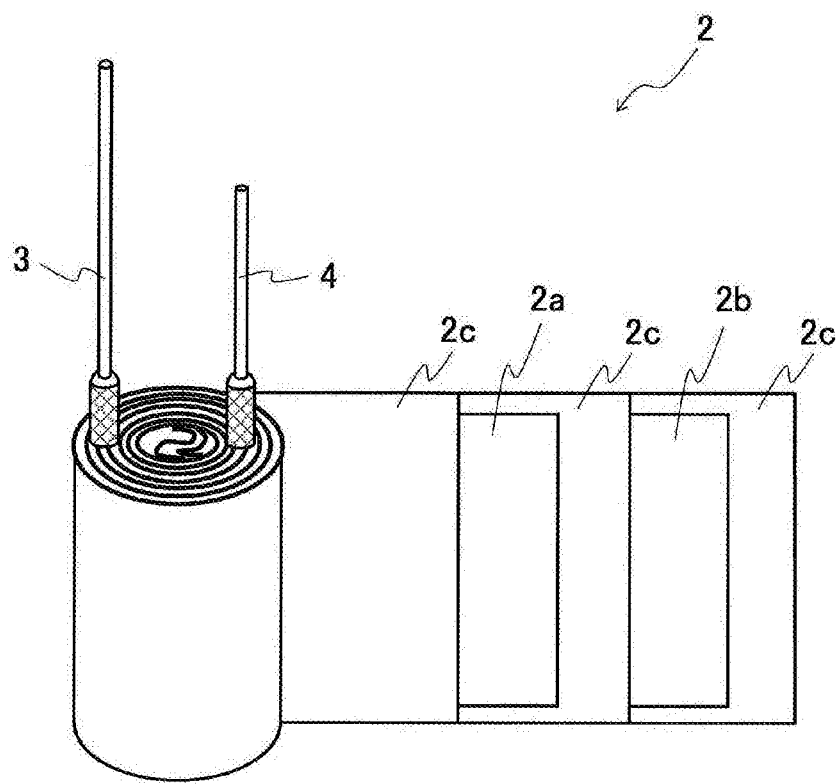
FIG. 3 is a figure illustrating a state where an anode foil and a cathode foil are wound with a separator provided between the foils in the manufacturing process of the capacitor element of FIG. 1.

The solid electrolytic capacitor 1 according to the embodiment can be manufactured by a known method such as one described in JP-A-2020-119916 except for using the electrolytic solution $2g$ according to the embodiment. An outline is given below. For example, metal foils with surfaces which are made rough through etching treatment are used for the anode foil $2a$ and the cathode foil $2b$. First, the anode foil $2a$ is immersed in a predetermined chemical conversion solution tank, and a predetermined voltage is applied to form the oxide film $2d$. Next, as illustrated in FIG. 3, the capacitor element 2 having a column shape is formed by winding the anode foil $2a$ to which the first lead terminal 3 is connected and the cathode foil $2b$ to which the second lead terminal 4 is connected with the separator $2c$ provided between the foils. Next, the wound capacitor element 2 is immersed in a predetermined chemical conversion solution (for example, an aqueous solution of ammonium adipate or the like) tank, and a predetermined voltage is applied (for example, 100 [V], 5 [minutes]) to form a new oxide film at a defect part of the oxide film $2d$ which is formed while the first lead terminal 3 is connected or during winding and to thus repair the defect part.

Next, the solid electrolyte $2f$ containing a conductive polymer is introduced. As described above, as a method for introducing the conductive polymer, a method of polymerizing and synthesizing the conductive polymer in the capacitor element 2, a method of introducing a conductive polymer dispersion or a conductive polymer solution of self-doping type and removing the dispersant or the solvent or the like can be used. Specifically, when a conductive polymer dispersion is introduced, for example, the capacitor element 2 is immersed in a predetermined dispersion tank in which an additive is appropriately added to a conductive polymer dispersion. After certain time has passed, the capacitor element 2 is removed, and the dispersant is removed by heat treatment or the like. By repeating this operation more than once, the solid electrolyte $2f$ can be introduced between the electrode foils $2a$, $2b$ in the capacitor element 2.

The concentration of the conductive polymer in the dispersion or the number of the operation are appropriately adjusted. For example, the concentration of the conductive polymer in the dispersion is suitably around 0.1 [vol %] to 10 [vol %]. When the concentration is 0.1 [vol %] or more, a predetermined characteristic of the capacitor 1 can be exhibited. A preferable concentration is more suitably 1 [vol %] or more, further suitably 2 [vol %] or more. Moreover, when the concentration is 10 [vol %] or less, the conductive polymer can be dispersed evenly in the dispersion. A preferable concentration is more suitably 7 [vol %] or less, further suitably 3 [vol %] or less.

Next, the electrolytic solution $2g$ and an additive, when necessary, are introduced. For example, the capacitor element 2 is immersed in a tank of the electrolytic solution $2g$ in which the additive is appropriately added to the electrolytic solution $2g$ for certain time. As a result, the electrolytic solution $2g$ and the additive can be impregnated between the electrode foils $2a$, $2b$. In this regard, the concentration of the electrolytic solution $2g$ is appropriately adjusted by adding a predetermined amount of water to the electrolytic solution $2g$. The basic component of the solute of the electrolytic solution $2g$ contains the amine according to the embodiment represented by the general formula (1) described above. A commercial product can be used as the amine.

Next, the lead terminals 3, 4 are caused to go through the through holes in the sealing part 6 and fit in predetermined positions, and the capacitor element 2 is housed in the case 5 in this state. Then, the opening of the case 5 is sealed with the sealing part 6. The opening can be sealed, for example, by swaging. Then, the case 5 is appropriately covered with an external sleeve. Moreover, the oxide film $2d$ is repaired by applying a predetermined voltage. The solid electrolytic capacitor 1 can be manufactured by the above procedures. In this regard, however, the procedures show an example, and the order may be changed.

EXAMPLES

Solid electrolytic capacitors having a rated voltage of 25 [V] were produced by a similar method to that in the embodiment described above. In this regard, however, aluminum foils were used for the anode foil and the cathode foil. For the conductive polymer, "polystyrenesulfonic acid" (PSS)-doped "poly(3,4-ethylenedioxythiophene)" (PEDOT) was used, and an aqueous dispersion of the PEDOT-PSS was introduced between the electrode foils. As the electrolytic solutions, electrolytic solutions prepared with the compositions shown in Table 1 were used. Specifically, in all the examples, the solvent was diethylene glycol, and the acid component of the solute was phthalic acid. The basic components of the solutes were bis(2-methoxyethyl)amine in Example 1 and bis(2-ethoxyethyl)amine in Example 2, while the basic component in Comparative Example 1 was triethylamine. In all the examples, the numbers of moles of the basic components in the electrolytic solutions were adjusted to almost the same (0.0372 to 0.0375). The "number of moles" here refers to the value obtained by dividing the [parts by mass], which is a relative amount, by the molecular weight (the same applies below).

Here, the pKa of bis(2-methoxyethyl)amine is 8.67±0.19, and the pKa of bis(2-ethoxyethyl)amine is 8.62±0.19 (both are predicted values). The pKa of triethylamine is 10.75 (at 25[° C.]).

TABLE 1

| Components of Electrolytic Solution | | | Molecular Weight | Amount [Parts by Mass] | | |
|---|---|---|---|---|---|---|
| | | | | Example 1 | Example 2 | Comparative Example 1 |
| Solvent | | Diethylene Glycol | 106.12 | 100 | 100 | 100 |
| Solute | Acid Component | Phthalic Acid | 166.14 | 6.25 | 6.25 | 6.25 |
| | Basic Component | Bis(2-methoxyethyl)amine | 133.19 | 5.00 | | |
| | | Bis(2-ethoxyethyl)amine | 161.24 | | 6.00 | |
| | | Triethylamine | 101.19 | | | 3.78 |
| Number of Moles of Basic Component | | | | 0.0375 | 0.0372 | 0.0374 |

To assess the long-term reliability of the solid electrolytic capacitor of each example, a high-temperature load test for maintaining at 135[° C.] for 1000 [hours] while applying a rated voltage of 25 V was conducted, and the capacitances and the dissipation factors (tan δ) at a frequency of 120 [Hz], the ESR values at a frequency of 10 [kHz] and at a frequency of 100 [kHz] and the leakage currents (abbreviated to as L.C.) under application of a rated voltage of 25 [V] for 1 [minute] were measured before and after the test. The results are shown in Table 2. In the tables, ΔC shows the change in capacitance (ΔC=(capacitance after test−capacitance before test)/capacitance before test×100).

TABLE 2

| | Capacitance [μF] | ΔC [%] | Tanδ | L.C. [μA] | ESR at 10 kHz [mΩ] | Change in ESR (10 kHz) [time] | ESR at 100 kHz [mΩ] | Change in ESR (100 kHz) [time] |
|---|---|---|---|---|---|---|---|---|
| Initial Characteristics | | | | | | | | |
| Example 1 | 438.1 | — | 2.64 | 23.1 | 13.6 | — | 9.7 | — |
| Example 2 | 437.8 | — | 2.64 | 18.6 | 13.7 | — | 9.8 | — |
| Comparative Example 1 | 438.2 | — | 2.71 | 24.4 | 13.9 | — | 10.1 | — |
| Characteristics after Maintaining with 25 V in Atmosphere at 135° C. for 1000 Hours | | | | | | | | |
| Example 1 | 404.1 | −7.8 | 8.21 | 11.6 | 84.2 | 6.2 | 56.9 | 5.9 |
| Example 2 | 405.8 | −7.3 | 7.98 | 11.4 | 80.6 | 5.9 | 55.2 | 5.6 |
| Comparative Example 1 | 386.1 | −11.9 | 20.98 | 11.7 | 324.4 | 23.4 | 247.4 | 24.5 |

As shown in Table 2, almost no difference in the performance of the capacitors (the measured values) was observed between Examples 1 and 2 and Comparative Example 1 before applying the load, but the performance of the capacitor deteriorated significantly in Comparative Example 1 compared to those of Examples 1 and 2 after applying the load. On the other hand, the decrease in the capacitance, the increase in the dissipation factor and the increase in the ESR could be all prevented in Examples 1 and 2, and the leakage currents could be kept at low values of 11.4 to 11.6 [μA]. From the results, it was shown that, when the basic component of the solute of the electrolytic solution is bis(2-methoxyethyl)amine (Example 1) or bis(2-ethoxyethyl) amine (Example 2), the heat resistance is improved, and deterioration is suppressed. Moreover, the characteristics of the capacitor can be made to last for a long time.

The present invention is not limited to the Examples above and can be changed in various manners in the scope which does not depart from the present invention.

What is claimed is:

1. A solid electrolytic capacitor comprising:
    an anode foil having a dielectric layer formed thereon;
    a cathode foil; and
    a solid electrolyte and an electrolytic solution in a gap between the anode foil and the cathode foil,
    wherein the electrolytic solution contains a solvent and a solute,
    the solute contains an acid component and a basic component and
    the basic component contains an amine represented by the general formula (1)
    [Chem. 1]

$$NR^1{}_{(3-m)}(-(R^2O)_n-R^3)_m \quad (1)$$

wherein in the formula, $R^1$ represents hydrogen or an alkyl group, $R^2$ represents an alkylene group, $R^3$ represents an alkyl group, n represents an integer of 1 to 100, wherein $R^2$'s may be the same or different when n is 2 or more, and m represents an integer of 1 to 3, wherein $R^1$'s may be the same or different when m is 1, and when m is 2 or 3, $R^2$'s may be the same or different, n's may be the same or different, and $R^3$'s may be the same or different.

2. The solid electrolytic capacitor according to claim 1, wherein the solvent contains a polyol compound.

3. The solid electrolytic capacitor according to claim 2, wherein the number X of the hydroxy groups in the polyol compound satisfies the requirement X≥(Y/200), wherein Y represents the molecular weight of the polyol compound.

4. The solid electrolytic capacitor according to claim 3, wherein an acid dissociation constant pKa of a conjugate acid of the amine is 12.0 or less.

5. The solid electrolytic capacitor according to claim 2, wherein an acid dissociation constant pKa of a conjugate acid of the amine is 12.0 or less.

6. The solid electrolytic capacitor according to claim 1, wherein an acid dissociation constant pKa of a conjugate acid of the amine is 12.0 or less.

7. A method for manufacturing a solid electrolytic capacitor including:
an anode foil having a dielectric layer formed thereon;
a cathode foil; and
a solid electrolyte and an electrolytic solution in a gap between the anode foil and the cathode foil,
wherein the electrolytic solution is introduced into the gap between the anode foil and the cathode foil after the solid electrolyte is introduced into the gap and
an amine represented by the general formula (1) is contained in a solute of the electrolytic solution:

[Chem. 2]

$$NR^1{}_{(3-m)}(\!-\!(R^2O)_n\!-\!R^3)_m \tag{1}$$

wherein in the formula, $R^1$ represents hydrogen or an alkyl group, $R^2$ represents an alkylene group, $R^3$ represents an alkyl group, n represents an integer of 1 to 100, wherein $R^2$'s may be the same or different when n is 2 or more, and m represents an integer of 1 to 3, wherein $R^1$'s may be the same or different when m is 1, and when m is 2 or 3, $R^2$'s may be the same or different, n's may be the same or different, and $R^3$'s may be the same or different.

* * * * *